(12) United States Patent
Venanzoni et al.

(10) Patent No.: US 11,911,239 B2
(45) Date of Patent: Feb. 27, 2024

(54) DENTAL IMPLANT AND SUPERSTRUCTURE FOR DENTAL PROSTHESIS

(71) Applicant: TRI Dental Implants Int. AG, Huenenberg (CH)

(72) Inventors: Sandro Venanzoni, Zürich (CH); Rafael Perez, Freiburg (DE); Ronald Jung, Kuesnacht (CH); Tobias Richter, Kuesnacht (CH)

(73) Assignee: TRI Dental Implants Int. AG, Huenenberg (CH)

( * ) Notice: Subject to any disclaimer, the term of this patent is extended or adjusted under 35 U.S.C. 154(b) by 70 days.

(21) Appl. No.: 17/101,801

(22) Filed: Nov. 23, 2020

(65) Prior Publication Data

US 2021/0068932 A1 Mar. 11, 2021

Related U.S. Application Data

(63) Continuation of application No. PCT/EP2019/053101, filed on Feb. 8, 2019.

(30) Foreign Application Priority Data

Jun. 4, 2018 (DE) ..................... 10 2018 113 237.9

(51) Int. Cl.
*A61C 8/00* (2006.01)
(52) U.S. Cl.
CPC .......... *A61C 8/0054* (2013.01); *A61C 8/0074* (2013.01)
(58) Field of Classification Search
CPC ... A61C 8/0072; A61C 8/0054; A61C 8/0066; A61C 8/006; A61C 8/0056; A61C 8/0075; A61C 8/0069
See application file for complete search history.

(56) References Cited

U.S. PATENT DOCUMENTS 5,342,199 A 8/1994 Gillespie
5,711,669 A 1/1998 Hurson
(Continued)

FOREIGN PATENT DOCUMENTS

DE 102016008669 A1 1/2018
EP 0868889 A1 10/1998
(Continued)

OTHER PUBLICATIONS

International Preliminary Report on Patentability for International Application No. PCT/EP2019/053101, dated Dec. 17, 2020.
(Continued)

*Primary Examiner* — Jacqueline T Johanas
*Assistant Examiner* — Shannel Nicole Belk
(74) *Attorney, Agent, or Firm* — Jason H. Vick; Sheridan Ross, PC (57) ABSTRACT

Dental implant, comprising an external thread arranged on an outside of the dental implant for fastening the dental implant to a jawbone. Further, the implant comprises an opening extending along a longitudinal axis of the dental implant, in which opening an internal thread for fastening a superstructure to the dental implant is arranged. Still further, the implant comprises an interface for fastening the superstructure to the dental implant, which interface is arranged at a front end of the dental implant. The interface is suitable for direct attachment of a superstructure to the dental implant without the use of an abutment.

21 Claims, 4 Drawing Sheets

(56) References Cited

U.S. PATENT DOCUMENTS

| | | |
|---|---|---|
| 6,164,969 A | 12/2000 | Dinkelacker |
| 2007/0264612 A1 | 11/2007 | Mount |
| 2014/0011160 A1* | 1/2014 | Jorneus ............... A61C 8/0066 433/173 |
| 2014/0106305 A1 | 4/2014 | Jacoby et al. |
| 2016/0008100 A1* | 1/2016 | Bolleter ............... A61C 8/006 433/174 |
| 2016/0367341 A1* | 12/2016 | Pérez Yanini ....... A61C 8/0054 |
| 2018/0092720 A1 | 4/2018 | Aravena et al. |
| 2018/0140393 A1 | 5/2018 | Matouk |
| 2018/0147030 A1* | 5/2018 | Bolleter ............... A61C 8/0057 |
| 2019/0298498 A1 | 10/2019 | Spindler |
| 2020/0330192 A1* | 10/2020 | Richard ............... A61C 8/0068 |

FOREIGN PATENT DOCUMENTS

| | | |
|---|---|---|
| EP | 2444026 A1 | 4/2012 |
| EP | 2491885 A1 | 8/2012 |
| EP | 3053540 A1 | 8/2016 |
| KR | 2006-0025770 A | 3/2006 |
| KR | 10-0952688 B1 | 4/2010 |
| KR | 10-2011-0028940 A | 3/2011 |
| WO | WO 95/13028 A1 | 5/1995 |
| WO | WO 2006/019225 A1 | 2/2006 |
| WO | WO 2016/144127 A1 | 9/2016 |

OTHER PUBLICATIONS

Invitation to Pay Fees and, where Applicable, Protest Fee for International Application No. PCT/EP2019/053101, mailed Jun. 5, 2019.

International Search Report for International Application No. PCT/EP2019/053101, dated Oct. 22, 2019.

Written Opinion for International Application No. PCT/EP2019/053101, dated Oct. 22, 2019.

Office Action (Including Translation) for corresponding Chinese Patent Application No. 201980038056.7, dated Jul. 16, 2021.

European Search Report for corresponding European Application No. 21162263.4, dated Jun. 29, 2021.

Notification of Reasons for Refusal (Including Translation) for corresponding Japanese Patent Application No. 2020-566609, dated Jan. 13, 2022.

U.S. Appl. No. 18/512,383, filed Nov. 17, 2023, Venanzoni et al.

* cited by examiner

DENTAL IMPLANT AND SUPERSTRUCTURE FOR DENTAL PROSTHESIS

CROSS REFERENCE TO RELATED APPLICATIONS

This application is a continuation of international patent application PCT/EP2019/053101, filed on Feb. 8, 2019 designating the U.S., which international patent application has been published in German language and claims priority from German patent application DE 10 2018 113 237.9, filed on Jun. 4, 2018. The entire contents of these priority applications are incorporated herein by reference.

BACKGROUND

This disclosure relates to a dental implant for a dental prosthesis. Further, the disclosure relates to a superstructure for a dental prosthesis which may be used as counterpart to the dental implant. Still further, the disclosure relates to a method of manufacturing a dental prosthesis.

The term "dental implant" is colloquially often used inconsistently and erroneously for the overall structure of a dental prosthesis. Therefore, it should be clarified at this point that a "dental implant" in the medical and present sense only means the implant body, i.e. the artificial tooth root that is implanted in the patient's jaw. Therefore, the term "implant body" is often used instead of the term "dental implant". In the following, however, the term "dental implant" is uniformly used for the aforesaid part of the dental prosthesis.

Conventional dental prostheses of this type comprise a so-called abutment in addition to the dental implant, which abutment acts as a connecting part between the dental implant and the implant crown (superstructure). The abutment forms the sensitive transition through the peri-implant soft tissue to the oral cavity and the superstructure. Such abutments are sometimes referred to as "pillars" or "implant posts". Commonly, abutments are made of titanium, ceramic or ceramic composites such as aluminum oxide or zirconium dioxide ceramic.

The superstructure, i.e. the artificial tooth crown, is typically made of ceramic or a comparable material. Traditionally, the superstructure is made by a dental technician as follows: First, a wax model is created for the artificial tooth crown. Then, the wax model is used to cast the artificial tooth crown. The abutment is manually ground down to the correct size and shape and in the final step the cast artificial tooth crown is mounted on the abutment. In most cases, the assembly is performed by bonding the superstructure to the abutment. This process, which is largely performed manually, allows highly precise results to be achieved. However, it goes without saying that this is time-consuming and therefore also cost-intensive. Additionally, there is an adhesive gap between the superstructure and the abutment, which gap is susceptible to leaks and can also limit the durability of the dental prosthesis.

Today there are many efforts to digitize or automate the above-mentioned process as far as possible. The superstructure is now often milled on a milling machine on the basis of a 3D model. In this type of fabrication, the connection geometry for the connection with the abutment is inserted directly into the superstructure on its rear side. The shape and size of the abutment must therefore already be known when the artificial tooth crown is fabricated in order to program the milling machine accordingly. This is usually done by means of a CAD model of the abutment, which is read into the control system of the milling machine.

Since the shape and size of the abutment must be known before fabricating the superstructure, many manufacturers choose a short and small abutment that fits any anatomy. However, in the case of elongated, i.e. comparatively long superstructures, a short and small abutment is biomechanically unsuitable in relation to the superstructure, which may result in loosening or fractures.

Other manufacturers solve this by using many different abutments. Depending on the shape and size of the superstructure, abutments of different sizes or shapes are then used. For example, a different abutment has to be used for an artificial incisor than for an artificial molar tooth. If, for example, the rear flank of the abutment is not beveled when used for an artificial incisor, the abutment would be visible on the rear side of the superstructure, which is undesirable from a purely esthetic point of view. However, this problem may not arise when used for an artificial molar tooth.

In automated fabrication with digital CAD models the manufacturer of the superstructure is usually provided with several CAD data sets that represent the different shapes of the abutments. At the same time, the manufacturer of the superstructure has to keep a large number of abutments of different shapes and sizes in stock. This is often cumbersome and also generates high storage costs.

The disadvantages of the previous approaches can thus be summarized as follows: On the one hand, the use of abutments restricts the freedom of shape and design of the superstructure including its transgingival portion. A non-flexible transgingival portion of the superstructure can cause problems, particularly with soft tissue management. However, ideal soft-tissue management is crucial for an esthetic result and a long-term stable bone level. On the other hand, the material and manufacturing costs for such a dental prosthesis according to the prior art are relatively high. In addition, there is an adhesive gap between the superstructure and the abutment, which gap is disadvantageous in many respects.

SUMMARY

It is an object to provide an improved dental implant and an improved superstructure that can be used in a dental prosthesis without an abutment arranged there between. The dental implant and the superstructure shall be designed such that they may be directly connected to one another, for example by screwing.

According to a first aspect, a dental implant is provided which comprises an external thread arranged on an outside of the dental implant for fastening the dental implant to a jawbone; an opening extending along a longitudinal axis of the dental implant, wherein an internal thread for fastening a superstructure to the dental implant is arranged in the opening; and an interface arranged at a front end of the dental implant for fastening the superstructure to the dental implant. The interface comprises a convex, rounded curvature extending around the longitudinal axis over an angular range of at least 90°, and a support surface arranged radially outwardly relative to the convex curvature. The support surface has at least one annular portion that is oriented transversely to the longitudinal axis. In a longitudinal section along the longitudinal axis of the dental implant, a tangent to a radially outer edge of the convex curvature that faces the annular portion of the support surface is oriented parallel or at an angle greater than 60° to the annular portion of the support surface.

The interface of the dental implant allows the superstructure to be attached directly and immediately to the dental implant without the use of an abutment. Due to the special design of the interface, the superstructure can be arranged at the interface in a clearly defined manner. This enables a clearly defined relative position between the superstructure and the dental implant.

A feature of the interface is the convex rounded curvature arranged thereon, which curvature extends at least over an angular range of 90° around the longitudinal axis. This curvature serves to attach the superstructure to the dental implant. It absorbs forces in a radial direction, i.e. orthogonal to the longitudinal axis. The curvature also serves as a centering device.

Herein, a "convex" curvature is understood to be any curvature that is curved outwards. A convex curvature is the opposite of a concave, inwardly curved recess. Only for clarification purposes, the convex curvature is sometimes herein additionally defined as rounded, although the term "convex" already implies such a rounding. The curvature defined herein as convex and rounded preferably comprises a continuous tangent gradient (without "kink").

Furthermore, the interface of the dental implant comprises a support surface, wherein at least a part or section of this support surface is annular and oriented transversely to the longitudinal axis of the dental implant. This annular portion of the support surface surrounds the convex curvature, i.e. it is arranged radially further out than the convex curvature. Herein, "transverse" means any type of alignment that is not parallel. "Transverse" can, but does not necessarily need to be orthogonal. Preferably, the annular support surface has a constant angle with respect to the longitudinal axis all around the longitudinal axis of the dental implant. Preferably, this angle is greater than 60°, but a right angle (90°) is particularly preferred.

The annular portion of the support surface serves to absorb axial forces parallel to the longitudinal axis. This prevents tensile stresses which could lead to fracture of the superstructure. Additionally, the annular portion of the support surface serves as a boundary or sealing surface to avoid gaps between the superstructure and the dental implant along the circumference through which gaps impurities could enter. The annular portion of the support surface therefore preferably forms the radially outermost area of the interface, which area surrounds all other areas of the interface including the curvature.

A tangent at the outer edge of the convex curvature, with respect to the radial direction, is either parallel or at an angle greater than 60° to the annular portion. Since the annular portion is preferably oriented orthogonally to the longitudinal axis, in this special case the tangent is oriented orthogonally or at an angle smaller than 30° to the longitudinal axis of the dental implant.

As already mentioned, the above-mentioned way of configuring the interface enables a clear positioning of the superstructure relative to the dental implant. Furthermore, it enables a stable and tight direct connection between the superstructure and the dental implant. Still further, the interface can be produced very easily and cost-effectively, as it can be manufactured in an automated way on a milling machine without any major problems. The described shape of the interface meets all mechanical requirements for a direct connection between titanium (typical material from which the dental implant is made) and ceramic (typical material from which the superstructure is made). The described shape of the interface also meets the requirements for a direct connection of titanium with titanium, in a case where both the superstructure and the dental implant are made of titanium. Additionally, the interface is suitable for the manufacturing process mentioned at the outset, in which the superstructure is manufactured in an automated way by means of a CAD model (for example, by machining or additive manufacturing processes).

According to a further aspect, a superstructure is presented, which comprises a through-hole extending along a longitudinal axis of the superstructure and an interface arranged at a front end of the superstructure for fastening the superstructure to a dental implant, wherein the interface comprises a concave recess or concave curvature extending around the longitudinal axis over an angular range of at least 90°, and a support surface arranged radially outwardly relative to the concave recess or curvature, wherein the support surface has at least one annular portion that is oriented transversely to the longitudinal axis, and wherein, in a longitudinal section along the longitudinal axis of the superstructure, a tangent to a radially outer edge of the concave recess or curvature that faces the annular portion of the support surface is oriented parallel or at an angle greater than 60° to the annular portion of the support surface.

According to a still further aspect, a method of manufacturing a dental prosthesis is presented, which comprises the following steps:

providing a dental implant having an opening extending along a longitudinal axis of the dental implant, an internal thread arranged in the opening, and having a first interface disposed at a front end of the dental implant, providing a superstructure having a through hole and a second interface that is arranged at a front end of the superstructure and that is configured to match the first interface;

providing a fastening element with an external thread matching the internal thread;

attaching the superstructure to the dental implant by means of the fastening element in such a way that the first interface contacts the second interface.

The superstructure is attached to the dental implant without an abutment arranged in between. Preferably, the first and second interfaces are produced in an automated way by milling using a CAD data set, preferably with the aid of a ball milling cutter. This simplifies the production of the dental prosthesis immensely and at the same time increases the freedom of design, since each dental prosthesis can be individually adapted to each patient without increased costs. An extra abutment is not required. Nevertheless, the connection between the superstructure and the dental implant is configured as a detachable connection.

In the following, various optional refinements are explained, which can refer not only to the dental implant, but in an equivalent way also to the superstructure and the method. Since the superstructure preferably forms the counterpart to the dental implant, its interface (second interface) is preferably shaped as a corresponding counterpart to the interface (first interface) of the dental implant. Accordingly, the features described in the following and the features defined in the dependent claims with respect to the dental implant also apply in the corresponding way to the interface of the superstructure.

According to a refinement, the interface is not rotationally symmetrical with respect to the longitudinal axis in order to form an anti-rotation device.

A rotationally symmetrical body is any body which, after a rotation in a plane through an angle smaller than 360°, congruently reproduces itself on itself. A cube (with a square base) thus has a 90° rotational symmetry about its main axis; a parallelepiped with a rectangular cross-sectional area has a 180° rotational symmetry about its main axis; and a prism with a cross-sectional area in the shape of an equilateral triangle has a 60° rotational symmetry. Since such rotational symmetry does not exist for the interface of the dental implant, the interface does not reproduce itself until it is rotated 360° about its longitudinal axis, but not until it is rotated about its longitudinal axis through any other angle <360°.

According to a refinement, the interface is mirror-symmetrical to a longitudinal sectional plane in which the longitudinal axis lies. It is preferred that the interface is mirror-symmetrical to a single longitudinal sectional plane in which the longitudinal axis lies. At the same time, however, as already mentioned, the interface is preferably not rotationally symmetrical with respect to the longitudinal axis.

There are several possibilities to create the non-rotationally symmetrical configuration of the interface. According to a first refinement, the convex curvature is non-rotationally symmetrical with respect to the longitudinal axis. According to another refinement, the convex curvature is rotationally symmetrical with respect to the longitudinal axis, but another part of the interface is non-rotationally symmetrical with respect to the longitudinal axis, so that the interface as a whole is non-rotationally symmetrical with respect to the longitudinal axis. In a further refinement, both the convex curvature and another part of the interface are non-rotationally symmetrical with respect to the longitudinal axis.

In a refinement, at least a part of the radially outer edge of the curvature and at least a part of a radially inner edge of the curvature each lie on a circular line. Thus at least a part of the radially outer edge of the curvature lies on a first circular line with a first radius and a part of the radially inner edge of the curvature lies on a second circular line with a second radius that is smaller than the first radius. At least a part of the base area of the curvature lies on an annular surface or on a section of an annular surface. In other words, the convex curvature has the shape of an annulus or part of an annulus when viewed in a top view along the longitudinal axis.

According to another refinement of the dental implant, the curvature is a circular sector when viewed in a longitudinal section of the dental implant. In other words, the cross section of the curvature has the shape of a circular sector or section of a circle, wherein the cross section lies in a plane that is spanned by the longitudinal axis and the thereto orthogonally oriented radial direction of the dental implant.

It is preferred that the central angle of the circular sector 90°. The curvature in the mentioned cross section thus has the shape of a quarter circle.

Since a ball milling cutter is preferably used to produce the curvature, which for titanium machining typically has a diameter of 1 mm, the circular sector, regardless of whether the center angle is 90°, smaller or larger, preferably has a radius of 0.5 mm. Such a radius of 0.5 mm can be produced most easily with the ball milling cutters that are typically used.

In a further refinement of the dental implant, the curvature forms a transition between the annular portion of the support surface and the opening, wherein the curvature is immediately adjacent to the opening. It is also preferred that the curvature is directly adjacent to the annular portion of the support surface.

According to this refinement, the annular portion of the support surface is thus directly adjacent to the radially outer edge of the curvature and the opening is directly adjacent to the radially inner edge of the curvature. The "radially outer" edge of the curvature is the part of the curvature that has the largest radial distance from the longitudinal axis compared to the other parts of the curvature. Accordingly, the "radially inner" edge of the curvature is the part of the curvature that has the smallest radial distance from the longitudinal axis compared to the other parts of the curvature.

According to a further refinement of the dental implant, the curvature extends over an angular range of at least 270° around the longitudinal axis. This allows radial forces to be absorbed by the curvature over a very large angular range and thus stabilizes the mechanical connection between the dental implant and the superstructure.

According to a further refinement of the dental implant, the curvature at the front end projects upwards in relation to the support surface, preferably in relation to the annular portion of the support surface. The curvature thus forms a structure that protrudes upwards.

In the latter refinement, it is preferred that the tangent to the radially outer edge of the curvature that faces the annular portion of the support surface is oriented at an angle greater than 60° to the annular portion of the support surface. The tangent is particularly preferably oriented orthogonally to the annular portion of the support surface.

According to a further refinement of the dental implant, the curvature comprises a notch on one segment as anti-rotation device. This notch can also be denoted as recess. The notch or recess contributes to the non-rotationally symmetrical configuration of the interface, wherein in this case the curvature itself is non-rotationally symmetrical and thus forms the anti-rotation protection.

According to a further refinement of the dental implant, at least part of the convex curvature is arranged in the central opening. In this refinement, it is preferred that the convex curvature is even arranged completely within the central opening.

Furthermore, in the latter refinement it is preferred that the tangent to the radially outer edge of the curvature that faces the annular portion of the support surface is oriented parallel to the annular portion of the support surface. Especially preferred is not only a parallel but also an aligned alignment. Accordingly, the curvature in this refinement preferably merges tangentially into the annular portion of the support surface.

In the refinement where the curvature is arranged in the opening, it is preferred that the curvature extends over an angular range of 360° around the longitudinal axis. In this refinement, the curvature is thus preferably rotationally symmetrical.

To form the required anti-rotation device, the interface may comprise an anti-rotation section that is not rotationally symmetrical with respect to the longitudinal axis and is arranged in the opening between the thread and the curvature. Preferably, this anti-rotation section comprises two surfaces that are arranged offset to one another along the longitudinal axis. These two surfaces are preferably arranged orthogonally to the longitudinal axis. In an exemplary refinement, the two surfaces each have the shape of a part of an annulus.

It goes without saying that the features referred to above and yet to be explained below can be used not only in the respective given combinations, but also in other combinations or alone without leaving the spirit and scope of the present disclosure.

DESCRIPTION OF PREFERRED EMBODIMENTS

Figure 1:
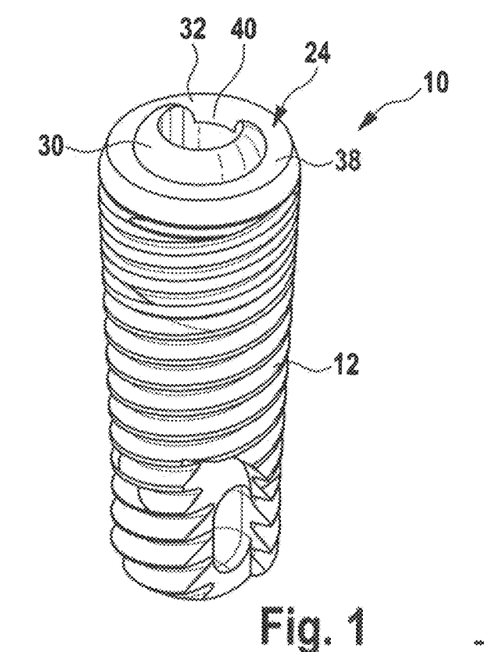
FIG. 1 shows a perspective view of a first embodiment of the dental implant.
Figure 2:
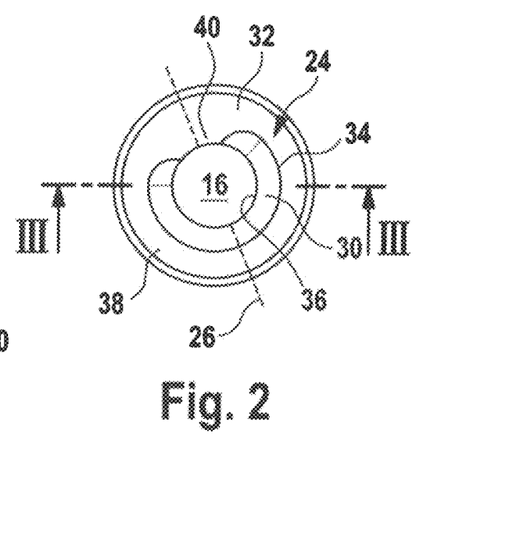
FIG. 2 shows a top view from above of the first embodiment of the dental implant shown in FIG. 1.
Figure 3:
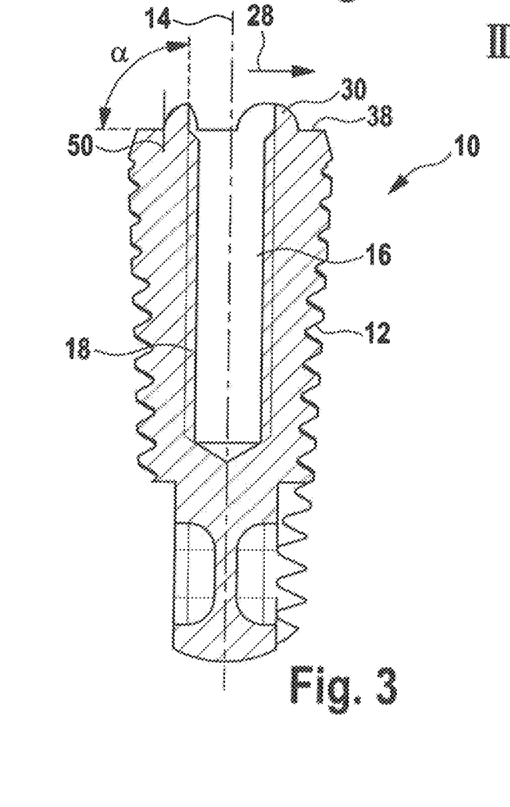
FIG. 3 shows a longitudinal section of the first embodiment of the dental implant shown in FIG. 1.

FIGS. 1-3 show a first embodiment of the dental implant in various views. The dental implant is therein denoted in its entirety with the reference number 10.

The dental implant 10 is typically made of titanium or zirconium oxide. It comprises an external thread 12 on its outside, which thread allows the dental implant 10 to be screwed into a patient's jawbone. The dental implant 10 extends substantially along a longitudinal axis 14, which may be also denoted as central axis. The dental implant 10 comprises an opening 16 in its interior, which opening extends along the longitudinal axis 14. Preferably, at least part of this opening 16 is configured as a hole, particularly preferably as a blind hole. An internal thread 18 is arranged in the opening 16. This internal thread serves to attach a superstructure 20 (artificial tooth crown) to the dental implant 10. A screw 22, which engages in the internal thread 18, is preferably used to attach the superstructure to the dental implant 10 (see FIG. 9).

At the upper front end, the dental implant 10 comprises an interface 24 (first interface 24), which is shown enlarged from above in FIG. 2 in a plan view. This interface 24 serves to attach the superstructure 20 to the dental implant 10. The interface 24 so to say forms the contact surface with which the dental implant 10 contacts the superstructure 20 in the assembled state.

A characteristic feature of the interface 24 is that its shape and design allows a direct attachment of the superstructure 20 to the dental implant 10 (without the use of an abutment arranged in between). In the embodiment shown in FIGS. 1-3, the interface 24 is designed non-rotationally symmetrical with respect to the longitudinal axis 14 of the dental implant 10 to form an anti-rotation device. On the other hand, it is mirror symmetrical with respect to a longitudinal section plane that is indicated in FIG. 2 with a dashed line 26. This longitudinal sectional plane 26 is defined by the longitudinal axis 14 and the radial direction 28 running orthogonally to it. It divides the dental implant 10 into two halves of equal size.

The interface 24 comprises a curvature 30 and a support surface 32 surrounding the curvature 30. The curvature 30 is mainly used to absorb forces in radial direction 28. The support surface 32 serves as an axial support, which mainly absorbs forces in the longitudinal direction, i.e. along the longitudinal axis 14. In the assembled state, the superstructure 20 is supported on both the curvature 30 and the support surface 32.

The curvature 30 is convex, i.e. curved outwards. The curvature 30 is rounded, i.e. not angular. The curvature 30 extends over an angular range of at least 90° around the longitudinal axis 14. In the embodiments shown in FIGS. 1-3, this angular range is even greater than 200°.

In this embodiment, the curvature 30 is not rotationally symmetrical. Viewed in cross-section (see FIG. 3), the curvature 30 is preferably configured as a circular sector with a central angle of $\alpha=90°$. However, it goes without saying that other central angles $\alpha$ are also possible. Likewise, the curvature 30 does not necessarily have to be circular in cross section. It can also be elliptically shaped or configured as a free-form surface.

The outer edge 34 and the inner edge 36 of the curvature 30 preferably lie on a circular line. In the plan view shown in FIG. 2, the curvature 30 is thus at least in sections annular. Thus, the curvature 30 forms a part of the surface of a torus.

Preferably, the curvature 30 directly adjoins the opening 16. In the embodiment shown in FIGS. 1-3, the inner edge 36 of the curvature 30 forms the upper edge of the opening 16. The outer edge 34 of the curvature 30 preferably directly adjoins an annular portion 38 of the support surface 32. This annular portion 38 runs transversely, preferably at an angle greater than 60°, particularly preferably orthogonally to the longitudinal axis 14 of the dental implant 10. The curvature 30 projects upwards in relation to this annular portion 38.

As can also be seen in FIGS. 1 and 2, the curvature 30 comprises a notch 40 on a part of its circumference. At this notch 40, the curvature 30 is interrupted. The notch 40 serves as an anti-rotation device to protect the superstructure 20 from rotating relative to the dental implant 10.

Figure 7:
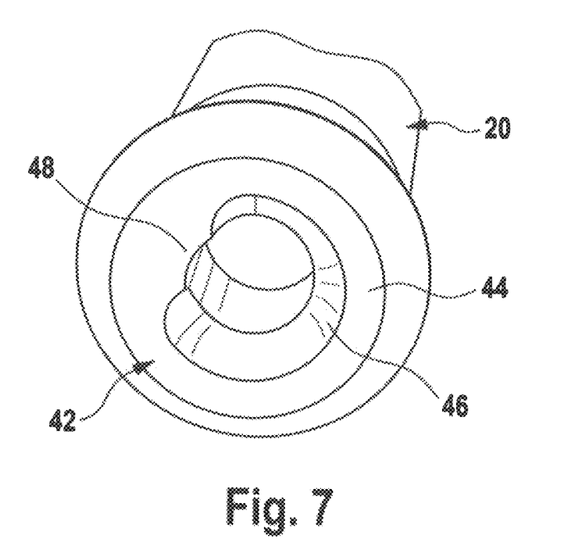
FIG. 7 shows a perspective detail view of a lower side of a superstructure matching the dental implant shown in FIGS. 1-3.

FIG. 7 shows the interface 42 formed as a counterpart on the lower side of the superstructure 20, which interface is herein referred to as the second interface. The interface 42 also comprises a support surface 44 having at least one annular portion. As counterpart to the convex curvature 30, the interface 42 comprises a concave recess 46. Since this concave recess 46 is interrupted by a bar 48, the dental implant 10 and the superstructure 20 can only be arranged in a single defined position relative to one another. The support surfaces 32, 44 lie flat against each other and the convex curvature 30 engages in the concave recess 46.

To form connection between the dental implant 10 and the superstructure 20 that is as stable as possible, a tangent 50 to the outer edge 34 of the curvature is preferably oriented orthogonally to the support surface 32 or the annular portion 38. The angle of this tangent 50 to the annular portion 38 of the support surface 32 in this embodiment of the dental implant 10 is preferably at least 60°. This is advantageous not only because of the stability, but also for reasons of easier fabrication.

When comparing FIGS. 2 and 7, another advantage of the interfaces 24, 42 should be pointed out. By simple modification of the interface 44 it is possible to remove the anti-rotation device. For example, by omitting the bar 48 and designing the concave recess 46 all around, the anti-rotation device required for clear positioning between the superstructure 20 and the dental implant 10 is removed. This can be advantageous, for example, if such a clear positioning is not required. This may be advantageous, for example, if a bridge is mounted as superstructure 20 on the dental implant 10.

Figure 4:
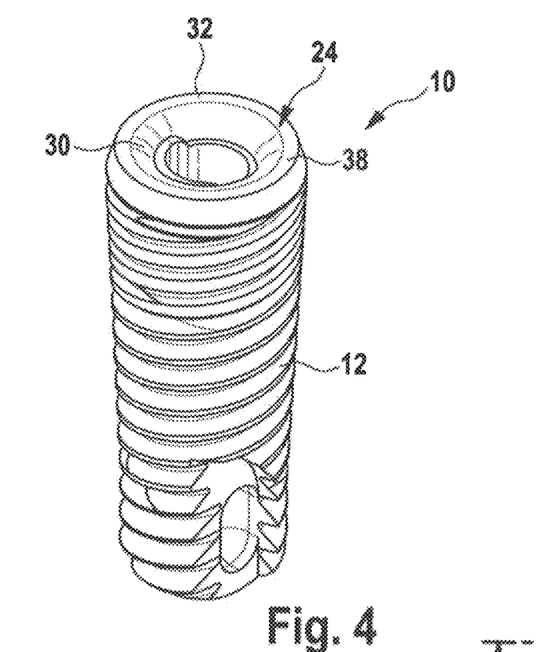
FIG. 4 shows a perspective view of a second embodiment of the dental implant.
Figure 5:
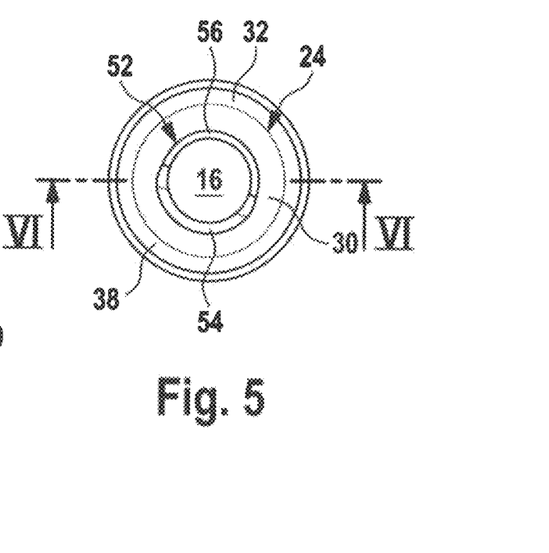
FIG. 5 shows a top view from above of the second embodiment of the dental implant shown in FIG. 4.
Figure 6:
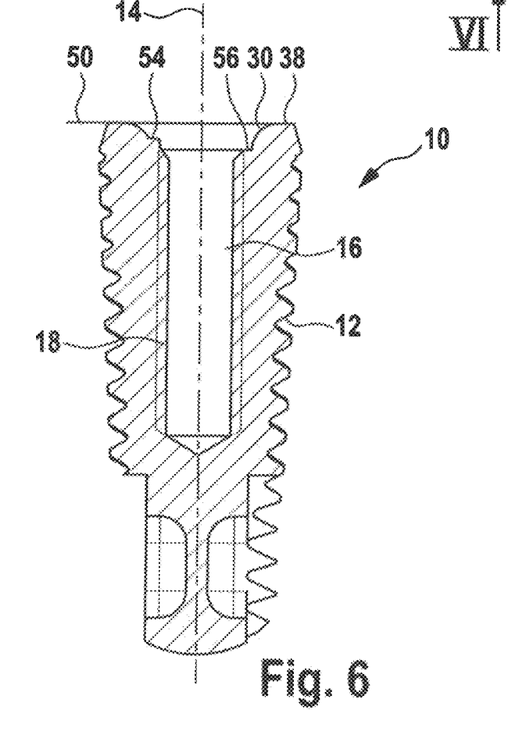
FIG. 6 shows a longitudinal section of the second embodiment of the dental implant shown in FIG. 4.

FIGS. 4-6 show a second embodiment of the dental implant 10. For the sake of simplicity, only the differences to the first embodiment shown in FIGS. 1-3 will be discussed below.

In the second embodiment shown in FIGS. 4-6, the support surface 32 has a continuous annular shape. Thus, the annular portion 38 forms the entire support surface 32, while the convex curvature 30 is at least partially arranged in the opening 16. It forms the upper end of the opening 16.

Another difference to the first embodiment is that the tangent 50 runs parallel to the annular portion 38 of support surface 32. More precisely, the annular portion 38 of the support surface 32 merges tangentially into the convex curvature 30 (see FIG. 6). The convex curvature 30 completely surrounds the longitudinal axis 14 in this embodiment. Thus, it extends over an angular range of 360° around the longitudinal axis 14. Accordingly, the convex curvature 30 is rotationally symmetrical according to this embodiment. Nevertheless, the interface 24 is in its entirety not rotationally symmetrical. In addition to the support surface 32 and the convexity 30, it comprises an anti-rotation section 52. Spatially considered, this anti-rotation section 52 is arranged in the opening 16 between the convex curvature 30 and the internal thread 18.

In the embodiment shown in FIGS. 4-6, the anti-rotation section 52 comprises two semicircular surfaces 54, 56 that are arranged offset to one another along the longitudinal axis 14. It is understood, however, that these two surfaces 54, 56 do not necessarily have to be semicircular. Preferably, the two surfaces 54, 56 are oriented orthogonally to the longitudinal axis.

Figure 8:
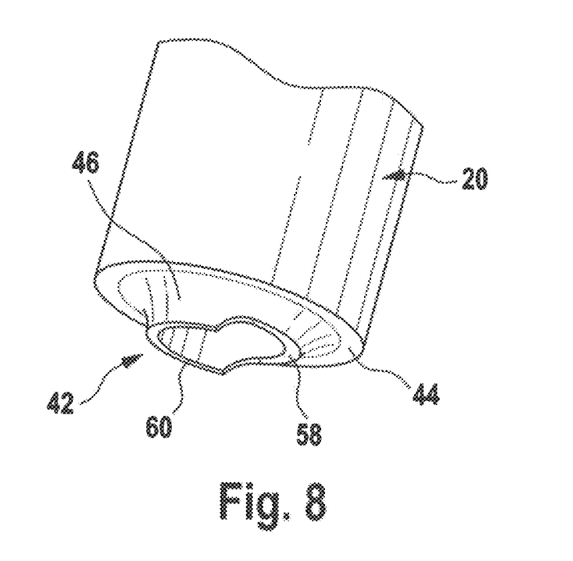
FIG. 8 shows a perspective detail of a lower side of a superstructure matching the dental implant shown in FIGS. 4-6.

FIG. 8 shows the interface 42 which serves as a counterpart to the interface 24 according to the second embodiment and is arranged on the lower side of the superstructure 20. The support surface 44 is again annular in shape. Corresponding to the convex curvature 30, a concave curvature 46 is provided on the lower side of the superstructure 20, which concave curvature in this case projects downwards from the support surface 44. As counterparts to the surfaces 54, 56, planar surfaces 58, 60 arranged adjacent to the concave curvature 46 are provided on the front end. These flat surfaces 58, 60 are here also designed as semi-circular surfaces and are arranged offset to each other in relation to the longitudinal axis 14.

In the assembled state, the support surface 32 of the dental implant 10 lies against the support surface 44 of the superstructure 20, the convex curvature 30 lies against the concave curvature 46, and the surfaces 54, 56 lie against the surfaces 58, 60. Here, too, the interfaces 24, 42 again allow only a single defined alignment of the dental implant 10 and the superstructure 20 relative to one another.

Figure 9:
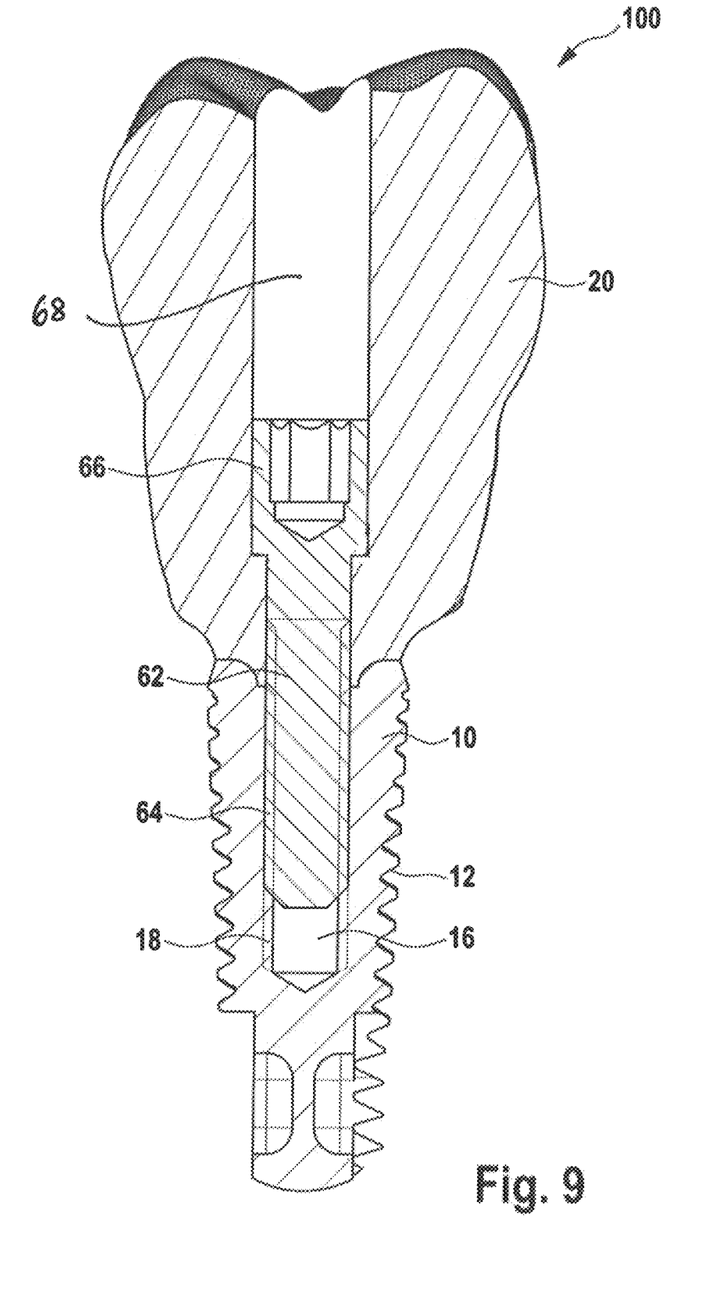
FIG. 9 shows a sectional view of a dental prosthesis which comprises the dental implant and the superstructure according to an embodiment.

FIG. 9 shows an embodiment of a dental prosthesis 100, in which the dental implant 10 is used. The first interface 24 of the dental implant 10 and the second interface 42 of the superstructure 20 are preferably manufactured in an automated way on the basis of a CAD data set by milling, preferably by means of a ball milling cutter. An extra abutment is not required. Nevertheless, the connection between the superstructure 20 and the dental implant 10 is configured as a detachable connection. The superstructure 20 is attached to the dental implant 10 with a fastening screw 62. The fastening screw 62 is inserted into the dental implant 10 through a through hole 68 in the superstructure 20. This through hole 68 is closed again after connecting the superstructure 20 to the dental implant 10. The fastening screw 62 comprises an external thread 64 at its lower edge which external thread engages in the internal thread 18 arranged in the dental implant 10.

Finally, it should be noted that the two embodiments of the dental implant 10 shown here represent only two of many possible embodiments. It goes without saying that various features of these two embodiments can be easily modified without leaving the scope of the present invention as defined in the appended claims. It is also understood that various features of these two embodiments can be combined and/or exchanged without leaving the scope of the present invention as defined in the appended claims.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A dental implant for a dental prosthesis, comprising:
an external thread arranged on an outside of the dental implant for fastening the dental implant to a jawbone;
an opening extending along a longitudinal axis of the dental implant, wherein an internal thread for fastening a superstructure to the dental implant is arranged in the opening; and
an interface arranged at a front end of the dental implant for fastening the super-structure to the dental implant;
wherein the interface comprises a convex, rounded curvature extending around the longitudinal axis over an angular range of at least 90°, and a support surface arranged radially outwardly relative to the convex curvature, wherein the support surface has at least one annular portion that is oriented transversely to the longitudinal axis, and
wherein, in a longitudinal cross section along the longitudinal axis of the dental implant, a tangent, that lies in the longitudinal cross section and is oriented tangentially to a radially outer edge of the convex curvature that faces the annular portion of the support surface, is oriented parallel to or coplanar with the annular portion of the support surface.

2. The dental implant according to claim 1, wherein the interface is not rotationally symmetrical with respect to the longitudinal axis.

3. The dental implant according to claim 1, wherein the interface is mirror-symmetrical to a longitudinal sectional plane in which the longitudinal axis lies.

4. The dental implant according to claim 1, wherein the annular portion has all around the longitudinal axis a constant angle greater than 60° to the longitudinal axis.

5. The dental implant according to claim 1, wherein the annular portion is oriented orthogonally to the longitudinal axis.

6. The dental implant according to claim 1, wherein at least a part of the radially outer edge of the curvature and at least a part of a radially inner edge of the curvature each lie on a circular line.

7. The dental implant according to claim 1, wherein in the longitudinal cross section of the dental implant the convex curvature has a shape of a circular sector.

8. The dental implant according to claim 7, wherein a central angle of the circular sector is 90°.

9. The dental implant according to claim 1, wherein the curvature forms a transition between the annular portion of the support surface and the opening and is directly adjacent to the opening.

10. The dental implant according to claim 1, wherein the angular range of the curvatures is at least 270°.

11. The dental implant according to claim 1, wherein at the front end the curvature projects upwards in relation to the support surface.

12. The dental implant according to claim 1, wherein the curvature comprises a notch on one segment, wherein said notch forms an anti-rotation device.

13. The dental implant according to claim 1, wherein at least a part of the convex curvature is arranged in the opening.

14. The dental implant according to claim 13, wherein the curvature merges tangentially into the annular portion of the support surface.

15. The dental implant according to claim 13, wherein the angular range of the curvature is 360°.

16. A dental implant comprising:
an external thread arranged on an outside of the dental implant configured to fasten the dental implant to a jawbone;
an opening extending along a longitudinal axis of the dental implant, wherein an internal thread configured to fasten a superstructure to the dental implant is arranged in the opening; and
an interface arranged at a front end of the dental implant configured to fasten the super-structure to the dental implant, wherein:
the interface comprises a convex, rounded curvature extending around the longitudinal axis over an angular range of at least 90°, and a support surface arranged radially outwardly relative to the convex curvature, wherein the support surface has at least one annular portion that is oriented transversely to the longitudinal axis, and
in a longitudinal cross section along the longitudinal axis of the dental implant, a tangent, that lies in the longitudinal cross section and is oriented tangentially to a radially outer edge of the convex curvature that faces the annular portion of the support surface, is oriented parallel to or coplanar with the annular portion of the support surface.

17. The dental implant according to claim 16, wherein the interface is not rotationally symmetrical with respect to the longitudinal axis.

18. The dental implant according to claim 16, wherein the interface is mirror-symmetrical to a longitudinal sectional plane in which the longitudinal axis lies.

19. The dental implant according to claim 16, wherein the annular portion has all around the longitudinal axis a constant angle greater than 60° to the longitudinal axis.

20. The dental implant according to claim 16, wherein the annular portion is oriented orthogonally to the longitudinal axis.

21. A dental implant for a dental prosthesis, comprising:
an external thread arranged on an outside of the dental implant configured to fasten the dental implant to a jawbone;
an opening extending along a longitudinal axis of the dental implant, wherein an internal thread configured to fasten a superstructure to the dental implant is arranged in the opening; and
an interface arranged at a front end of the dental implant configured to fasten the super-structure to the dental implant;
wherein the interface comprises a convex, rounded curvature extending around the longitudinal axis over an angular range of at least 90°, and a support surface arranged radially outwardly relative to the convex curvature, wherein the support surface has at least one annular portion that is oriented transversely to the longitudinal axis, and the convex, rounded curvature curves outwardly toward the longitudinal axis of the dental implant, and
wherein, in a longitudinal cross section along the longitudinal axis of the dental implant, a tangent, that lies in the longitudinal cross section and is oriented tangentially to a radially outer edge of the convex curvature that faces the annular portion of the support surface, is coplanar with the annular portion of the support surface.

* * * * *